United States Patent
Singh et al.

(10) Patent No.: US 12,126,428 B2
(45) Date of Patent: Oct. 22, 2024

(54) SECURE COMMUNICATION PROTOCOL OVER SATELLITE NETWORK

(71) Applicant: Accenture Global Solutions Limited, Dublin (IE)

(72) Inventors: Rajpreet Singh, Bangalore (IN); Saravana Kumar Palanivel Rajan, Bangalore (IN); Viresh Veerasangappa Kadi, Bijapur (IN); Mathan Murugasen, Bengaluru (IN); Veena Sudhakar Padiyar, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 335 days.

(21) Appl. No.: 17/588,893

(22) Filed: Jan. 31, 2022

(65) Prior Publication Data

US 2023/0124519 A1    Apr. 20, 2023

(30) Foreign Application Priority Data

Oct. 20, 2021    (IN) .............................. 202111047621

(51) Int. Cl.
  *H04W 12/06*    (2021.01)
  *H04B 7/185*    (2006.01)
  (Continued)

(52) U.S. Cl.
  CPC .......... *H04B 7/18513* (2013.01); *H04W 8/20* (2013.01); *H04W 12/06* (2013.01); *H04W 84/06* (2013.01)

(58) Field of Classification Search
  CPC .... H04B 7/18513; H04W 8/20; H04W 12/06; H04W 84/06
  See application file for complete search history.

(56) References Cited

U.S. PATENT DOCUMENTS

| 5,949,369 A | 9/1999 | Bradley et al. |
| 6,138,013 A | 10/2000 | Blanchard et al. |

(Continued)

FOREIGN PATENT DOCUMENTS

| EP | 0995323 | 2/2006 | |
| EP | 0995323 B1 * | 8/2006 | ............... H04Q 7/22 |

OTHER PUBLICATIONS

ETSI, "Satellite Earth Stations and Systems (SES); Satellite Emergency Communications (SatEC); Multiple Alert Message Encapsulation over Satellite (MAMES) deployment guidelines," Technical Report, ETSI TR 103 338 V1.1.1, May 2015, 68 pages.

(Continued)

*Primary Examiner* — Hai V Nguyen
(74) *Attorney, Agent, or Firm* — Polsinelli PC

(57) ABSTRACT

This disclosure describes a secure protocol for communication over a satellite network. On receiving a message from a mobile device that is currently not authorized to communicate over a satellite network, a gateway analyzes the message to determine whether the message includes a particular tag to indicate an authorization override. A message with a tag indicating an emergency message can be forwarded toward an emergency service provider determined based on the current location of the mobile device. A message with a tag indicating a subscription request can cause the gateway to generate and send subscription information to the mobile device, to allow the user to select a subscription and provide payment information to activate the subscription. In either scenario, a secure connection can be established between mobile device and gateway, through a handshake that employs burst messages over the satellite network.

20 Claims, 12 Drawing Sheets

(51) Int. Cl.
  *H04W 8/20* (2009.01)
  *H04W 84/06* (2009.01)

(56) References Cited

U.S. PATENT DOCUMENTS

| | | | |
|---|---|---|---|
| 6,567,668 B1 | 5/2003 | Valentine et al. | |
| 7,756,981 B2* | 7/2010 | Shastri | H04L 41/0894 |
| | | | 709/227 |
| 9,734,091 B2* | 8/2017 | Kadi | H04W 4/80 |
| 10,390,257 B2* | 8/2019 | Maria | H04W 28/0289 |
| 10,891,302 B2* | 1/2021 | Shankar | G06F 16/2358 |
| 11,184,796 B2* | 11/2021 | Maria | H04W 28/0289 |
| 11,758,499 B2* | 9/2023 | Ryu | H04W 12/082 |
| | | | 370/329 |
| 2009/0028318 A1 | 1/2009 | Bhogal et al. | |
| 2014/0213214 A1 | 7/2014 | Reis | |
| 2016/0048460 A1* | 2/2016 | Kadi | H04W 4/80 |
| | | | 713/193 |
| 2018/0027444 A1* | 1/2018 | Maria | H04W 28/0289 |
| | | | 370/235 |
| 2019/0213275 A1* | 7/2019 | Shankar | G06F 16/2358 |
| 2019/0373503 A1* | 12/2019 | Maria | H04W 28/0289 |
| 2021/0144539 A1* | 5/2021 | Edge | H04B 7/18526 |
| 2021/0399796 A1* | 12/2021 | Ryu | H04W 8/08 |
| 2022/0240084 A1* | 7/2022 | Speidel | H04W 8/04 |
| 2022/0248363 A1* | 8/2022 | Ryu | H04W 12/72 |
| 2022/0312301 A1* | 9/2022 | Christopherson | H04W 48/16 |
| 2022/0394449 A1* | 12/2022 | Edge | H04W 72/23 |
| 2023/0120473 A1* | 4/2023 | Ji | H04W 56/0025 |
| | | | 370/503 |
| 2023/0254694 A1* | 8/2023 | Ryu | H04W 76/30 |
| | | | 455/411 |

OTHER PUBLICATIONS

Extended Search Report in European Appln. No. 22195972.9, dated Mar. 3, 2023, 9 pages.

* cited by examiner

SECURE COMMUNICATION PROTOCOL OVER SATELLITE NETWORK

CROSS-REFERENCE TO RELATED APPLICATION

The present application claims priority to Indian Provisional Patent Application Serial no. 202111047621, which was filed at the Indian Patent Office on Oct. 20, 2021, and which is incorporated by reference into the present application.

TECHNICAL FIELD

This disclosure generally relates to satellite communications.

BACKGROUND

Satellite networks may allow devices to communicate from many remote regions on the Earth. For example, a satellite phone may allow a person on a boat in the middle of the ocean to place a call through a satellite in orbit.

SUMMARY

In general, an aspect of the subject matter described in this specification may involve a process for a secure communication protocol over a satellite network. A communication protocol may secure a satellite network from unauthorized use. Traditionally, a satellite gateway of a satellite network may prevent messages from mobile devices that are not authorized to communicate over the satellite network from being forwarded on to other devices. However, in some situations it may be desirable to allow mobile devices that are unauthorized to communicate over the satellite network to send a message with the satellite network. For example, in an emergency situation, it may be desirable to enable the mobile device to send an emergency message over a satellite network to request help from emergency responders when the mobile device is out of range of a cellular network, even in instances when the user may not otherwise be authorized to use the satellite network to communicate. As another example, it may be desirable to enable the mobile device to send a subscription message over the satellite network to initiate a subscription to use the satellite network, in instances when the user is not currently connected to a cellular network.

A gateway such as a satellite network gateway or cellular network gateway may determine whether a message is from a mobile device authorized to communicate over the satellite network. For example, the gateway may extract an identifier of a sending device from a received message, and determine whether the sending device is currently subscribed and authorized to communicate over the satellite network. For messages from unauthorized mobile devices, the satellite gateway may determine whether the messages include a particular tag, corresponding to an authorization override. Messages with such a tag may be processed accordingly, even though they were sent by a device that is not yet subscribed to use a satellite network. Messages that are from unsubscribed devices, and that lack the authorization override tag, may be discarded and not forwarded to any destination.

Recently, there has been an increase in the sale and use of mobile devices that are configured to communicate over a satellite network, through use of an L band or other suitable transceiver in the device. Users of such devices can subscribe to use the satellite network to communicate using their device. However, currently available solutions may require a user to be connected to a cellular network to subscribe for satellite service. For users that do not yet have a subscription to use a satellite network but find themselves outside a cellular network, there is currently no solution for authorizing satellite communication, even though their device is physically configured for such communication. The embodiments described herein provide systems and processes for enabling satellite communication to be requested in an ad hoc manner, even in instances when the user is outside cellular range, when the user wants or needs to communicate over a satellite network.

In some aspects, the subject matter described in this specification may be embodied in methods that may include the actions of: receiving, at a network gateway, a message that is transmitted over a satellite network from a mobile device; determining, by the network gateway, that the mobile device is not currently subscribed to communicate over the satellite network; based at least partly on the determining that the mobile device is not currently subscribed to communicate over the satellite network, analyzing, by the network gateway, the message to determine a message type included in the message; and based at least partly on the message type, providing, by the network gateway, authorization for the mobile device to communicate over the satellite network.

In some aspects, providing authorization includes: based at least partly on determining that the message type is an emergency message type, sending the message to an emergency message destination.

In some aspects, providing authorization includes: determining a location of the mobile device; and determining the emergency message destination based on the location of the mobile device.

In some aspects, providing authorization includes: based at least partly on determining that the message type is a subscription request message type, sending subscription information to the mobile device over the satellite network, the subscription information describing one or more subscriptions available for the mobile device; receiving, in response to the subscription information, a subscription activation request transmitted over the satellite network from the mobile device, the subscription activation request identifying a particular subscription of the one or more subscriptions; and activating the particular subscription for the mobile device.

In some aspects, providing authorization includes: determining a location of the mobile device based on location information included in the message; and determining, based on the location, the one or more subscriptions available for the mobile device.

In some aspects, the subscription information includes, for each of the one or more subscriptions: a time usage metric; a duration; a cost; and a description.

In some aspects, the subscription activation request includes encrypted payment information.

In some aspects, providing authorization includes: authenticating the mobile device, including performing an authentication handshake over the satellite network between the network gateway and the mobile device, the authentication handshake employing one or more burst messages that are communicated via the satellite network.

In some aspects, the subject matter described in this specification may be embodied in a computing system that is programmed or otherwise configured to perform the methods described herein.

In some aspects, the subject matter described in this specification may be embodied in computer-readable storage media storing instructions that are executable to instruct a computing system to perform the methods described herein.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
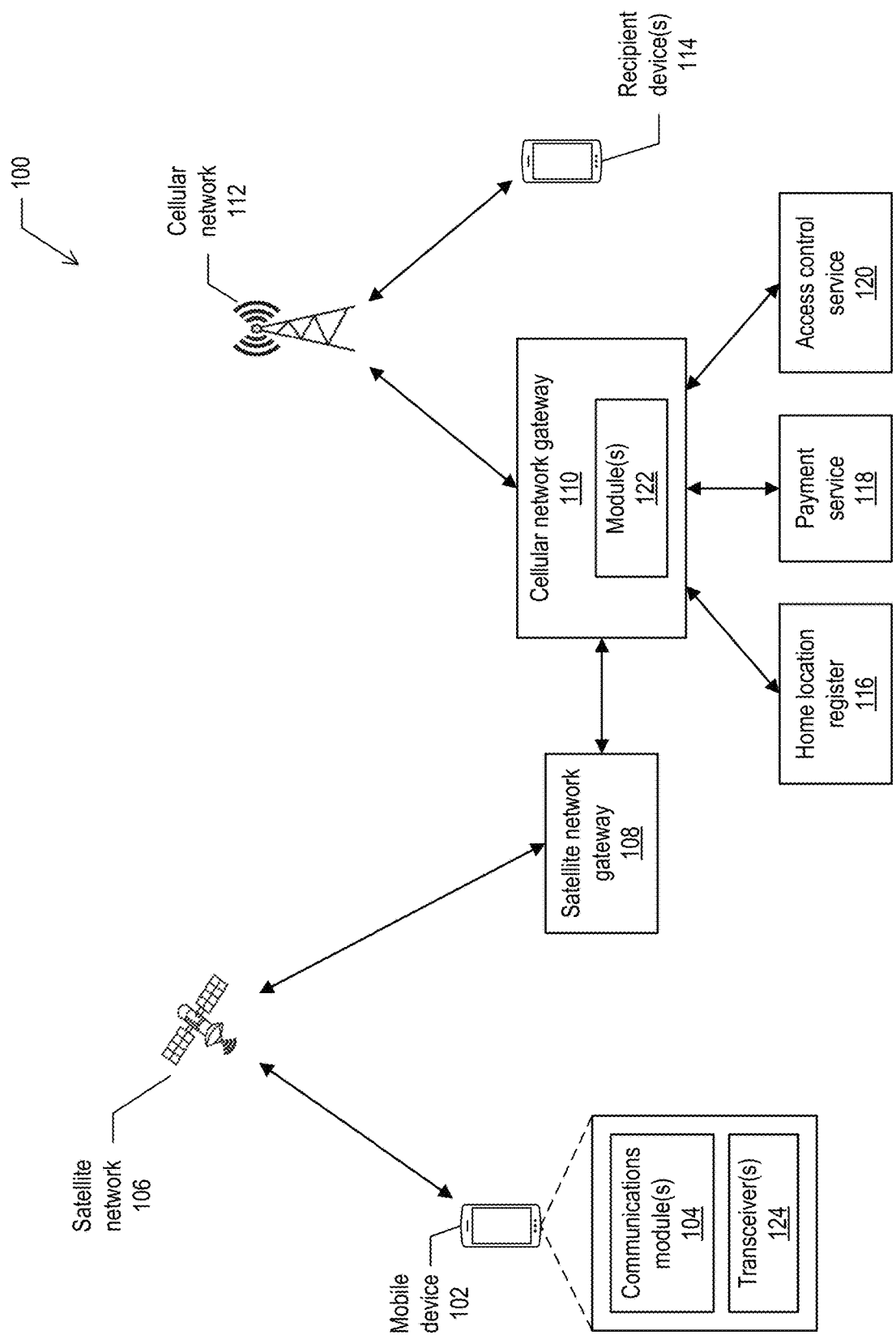
FIG. 1 is a diagram of an example system for communication over a satellite network.

FIG. 1 illustrates a diagram of an example system 100 for providing secure communications over a satellite network. The system 100 includes a mobile device 102. The mobile device 102 can be any suitable type of portable computing device, including but not limited to cell phones, smartphones, tablet computers, mobile gaming devices, vehicular (e.g., automotive) computers, wearable computers, implanted computing devices, and so forth. The mobile device 102 can execute one or more communications modules 104, such as a messaging application and/or a payment application.

The mobile device 102 can include one or more transceivers 124 that enable the mobile device to communicate over various types of networks, such as a satellite network 106, a cellular network 112, and so forth. For example, an L band transceiver of the mobile device 102 may enable the mobile device 102 to send and receive messages through the satellite network 106. The mobile device 102 can also include other transceiver(s) configured to communicate using other frequency ranges used by satellite networks.

The satellite network 106 is a communications network that is configured to send and receive communications via one or more satellites. A satellite is a device of any suitable design that operates to send and receive communications while positioned in an orbit or other suitable position above the surface of the earth. The satellite network 106 can also be described as a satellite constellation.

A satellite network gateway 108 can communicate with the satellite(s) and operate as an intermediary for communications between the satellite network 106 and other communications network(s) and/or device(s). The satellite network gateway 108 can include transceiver(s) for satellite communication and for communicating over other types of networks, as well as a suitable number of computing device(s) and/or other components for managing communications to and from the satellite network 106. The satellite network gateway 108 can also be described as a satellite gateway.

The cellular network gateway 110 can communicate with a cellular network 112 and operate as an intermediary for communications between the cellular network 112 and other communications network(s) and/or device(s). The cellular network gateway 110 can include transceiver(s) for communicating with the cellular network 112, as well as a suitable number of computing device(s) and/or other components for managing communications to and from the cellular network 112. The cellular network gateway 110 can also be described as a device message gateway, device gateway, or service gateway.

The cellular network gateway 110 is communicatively connected with the satellite network gateway 108 over one or more wired and/or wireless networks, such as wide area networks (WANs) (e.g., the Internet), telephone networks, and so forth. In some embodiments, the cellular network gateway 110 can execute various module(s) 122 for managing communications between the cellular network 112 and the satellite network gateway 108. Such module(s) 122 can include the following: a mobile originated message identifier module, for receiving and handling messages that originated with a mobile device 102 and that were transmitted via the satellite network 106; a mobile terminated message module, for creating and sending messages that are to be communicated over the satellite network 106 and that are to terminate at the mobile device 102; and a secure satellite communication module, for otherwise managing message traffic to and from the mobile device 102 via the satellite network 106.

The cellular network gateway 110 is configured to communicate over one or more network(s) with various other systems and/or services. For example, the cellular network gateway 110 can communicate with a home location register (HLR) 116. The HLR 116 can be hosted on one or more computing devices that are remote from the cellular network gateway 110 and accessible over network(s). In some examples, the HLR 116 can be hosted locally on the cellular network gateway 110 itself. In some implementations, the HLR 116 is a register, such as a list or database, which stores information describing a current (or recent) physical location of one or more mobile devices such as mobile device 102. For example, the HLR 116 can include a current geographic location (e.g., longitude, latitude, and/or altitude) and/or range of locations for any suitable number of devices. The HLR 116 can be periodically updated based on received location data regarding the various devices, such as data received from global positioning system (GPS) transceivers of the device(s) and/or cell tower proximity data received from the cellular network 112 (e.g., indicating which cell tower(s) are in communications range of the device at a given time).

The cellular network gateway 110 can communicate with a payment service 118 for managing payments to and from users of particular mobile device(s). The cellular network gateway 110 can also communicate with an access control service 120 that manages authorization and/or access of mobile device(s) to service(s). For example, the access control service 120 can store information regarding the authorization of the mobile device 102 to communicate over the satellite network 106, as described further herein. The services 118 and 120 may be remote from the cellular network gateway 110, and accessible over network(s). In some examples, either or both of the services 118 and 120 can be local to and hosted on the cellular network gateway 110.

The cellular network 112 can include any suitable number of structures or device(s) (e.g., cell towers, transceivers, nodes, repeaters, etc.) to enable wireless communication between devices over a broad geographic area, using designated frequency range(s) of the electromagnetic spectrum.

The system 100 can also include one or more recipient devices 114 that are configured with transceivers for communicating with the cellular network 112 and/or other types of networks. The recipient device(s) 114 can include any suitable number and/or type of device(s), such as computing device(s) and/or other types of communication-enabled device(s). In some examples, the recipient device(s) 114 may be an endpoint of a message that originates with the mobile device 102 and is transmitted over the satellite network 106. In some examples, the recipient device(s) 114 may originate a message that is to be communicated over the satellite network 106 and terminate at the mobile device 102. Embodiments described herein may enable such communication, for example in circumstances when traditionally available systems and processes may not allow such communications in the absence of a subscription to use a satellite network.

In some implementations, the mobile device 102 may be configured with a (e.g., L band) transceiver for communicating over the satellite network 106, but may be initially unauthorized (e.g., not yet registered and/or subscribed) to send and receive communications via the satellite network 106. For example, the mobile device 102 may not be subscribed to use the satellite network 106, but may be subscribed to use the cellular network 112. The mobile device 102 may enter an area in which cellular service is unavailable, e.g., out of range of the cellular network 112. In such instances, without an active authorization to use the satellite network 106, the user may be unable to communicate. For example, the mobile device 102 may be taken onto a boat in the middle of the ocean or into a large desert.

While the mobile device 102 does not have cellular service, a user of the mobile device 102 may need to send a message, such as an emergency (SOS) message, but may not have the means to do so. In some instances, the user may find themselves out of range of the cellular network 112 and may wish to activate a subscription to enable their use of the satellite network 106 to communicate. Embodiments described herein enable the user to communicate via the satellite network 106 by facilitating the authorization of the mobile device 102 for such communications, such as to send an SOS message to get help, and/or send a subscription message to activate a subscription to use a satellite network. Embodiments also support other use cases, such as enabling the user to use a satellite network as a promotion to entice the user to subscribe to such a service.

The mobile device 102 may receive input from a user into a messaging application, determine a type of message from the input, and determine whether to include in the message an authorization override (e.g., a tag) based on the type of message. For example, the mobile device 102 may determine that the user is sending a SOS message and, in response, generate a message including a tag that indicates that the type of the message is an SOS message. In another example, the mobile device 102 may determine that the user is sending a subscription request message and, in response, generate a message including a tag that indicates that the type of the message is a subscription request message.

In yet another example, the mobile device 102 may determine that the user is sending a general (e.g., non-emergency and non-subscription) message and, in response, generate a message that indicates that the type of the message is a general message without an authorization override.

The mobile device 102 may also include other information in the message. For example, the mobile device 102 may include a device identifier of ABC that is unique to the mobile device 102, a (e.g., GPS) location that indicates where the mobile device 102 is currently located, and text entered into the mobile device 102 by the user, e.g., "I'm injured."

The message may be transmitted over the satellite network 106, and the satellite gateway 108 may receive the message. The gateway 108 can forward the message (e.g., the message body) to the gateway 110, which can determine whether the mobile device 102 is currently authorized to communicate over the satellite network 106. For example, the gateway 110 may determine that no device with the device identifier of ABC, indicated by the message, is authorized to communicate over the satellite network 106. In another example, the gateway 108 or gateway 110 may determine that a device with the device identifier of XYZ is authorized to communicate over the satellite network 106.

For messages that are determined to be from a mobile device 102 that is authorized to communicate over the satellite network 106, the message may be forwarded toward a destination indicated by the message. For example, the gateway 110 may determine that the message is for a particular recipient cell phone number, and the message may be routed to a particular cellular network corresponding to the cell phone number. In another example, the gateway 110 may determine that the message is for a server and route the message to the server.

For messages that are from a mobile device 102 that is not yet authorized to communicate over the satellite network, the gateway 110 may determine whether the message includes an authorization override. Such an override may be in the form of a tag, e.g., a field with a particular value, that is included in the message. For example, the gateway 110 may determine that the message is from the device identifier ABC that is not currently authorized for satellite communication, but that the message includes a field with a value that indicates the message is of an SOS message type and, in response, determine to transmit the message toward a recipient device 114 of an emergency response service corresponding to a current location of the mobile device 102.

In another example, the gateway 110 may determine that the message is from the device identifier ABC that is not currently authorized for satellite communication, but that the message includes a field with a value that indicates the message is of a subscription message type and, in response, determine one or more subscriptions available to the user (e.g., based on the location of the mobile device 102). The subscription information can be communicated to the mobile device 102, and the user can input a selection of a particular subscription as well as payment information. The selection and payment information can then be sent back to the gateway 110, which processes the payment (e.g., through a payment service 118). If payment is successful, the subscription can be activated and the mobile device 102 can begin communicating via the satellite network 106 with various recipient device(s) 114.

In yet another example, the gateway 110 may determine that the message is from the device identifier ABC that is not authorized and does not include an authorization override and, in response, determine to ignore the message.

Traditionally, a satellite airtime subscription is necessary for a user to use their mobile device to communicate over a satellite network, even in the case of an emergency situation and/or for use of otherwise basic features such as short message service (SMS) multimedia messaging service (MMS), email, voice messaging, video messaging, and so forth. To subscribe for the satellite airtime for their satellite communication-enabled mobile device, the user must request and purchase the subscription when they are in cellular network coverage. To do so, the user can communicate with a service provider portal (e.g., gateway 110) to select a subscription and initiate payment. If the payment is successful the subscription is activated, and the user can then use their device to communicate via a satellite network. The gateway 110 also updates the HLR 116 when the mobile device 102 moves into a region without cellular coverage, e.g., where only a satellite network is available. With this HLR update, all the mobile-originated (MO) and mobile-terminated (MT) traffic from and to the user's mobile number can be appropriately routed through the gateway.

Currently available solutions require the user to purchase the subscription while connected over a cellular network, and only after the user has purchased the subscription can they use the features when the mobile device switches to a satellite network in areas where there is no cellular network available. Even in cases of an emergency, an already active satellite airtime subscription is necessary for the user to use their mobile device to communicate with emergency services when they are in a location with no cellular connectivity. Also, the user must have a subscription already active to use features such as SMS, MMS, and so forth. Currently, there may not be a mechanism that enables a user to initiate a satellite network subscription while outside of a cellular network, and no way for a user to send emergency messages when outside a cellular network. The embodiments described herein address these shortcomings in currently available systems.

Moreover, currently available solutions do not provide for secure communication to enable service over satellite network, such as using transport layer security (TLS). The embodiments described herein address this shortcoming as well. In particular, embodiments provide an authentication mechanism and secure communication protocol over satellite using short burst data. Traditionally secure communications are carried over a Hypertext Transfer Protocol Secure (HTTPs) channel using an Internet connection, with security provided by TLS. In the absence of an Internet connection, such HTTPs communication and security mechanisms provided around such channels are not available.

Embodiments address this shortcoming in traditional solutions through use of burst messages to provide a security handshake for device authorization. Satellite constellations typically provide short message communication channels, e.g., burst messaging. Being predominantly stateless, such burst messages typically do not allow for the use of conventional security mechanisms. Traditionally, at the start of a secured message communication, authentication is performed to ensure mutual authentication and trust between the communicating devices, such as between mobile device and gateway. To enable such initial authentication, embodiments use asymmetric encryption to establish mutual trust, the communications later switch to using a (e.g., AES256) strong encryption mechanism for a faster and more robust tunnel-like secure data channel. Embodiments achieve this within the data size limits imposed by the satellite-supported short burst channel. This security mechanism is described further with reference to FIGS. 4A and 4B.

By providing a mechanism for secure communications over the satellite network 106, embodiments also enable use of the secure communications for transmitting payment information to initiate a subscription. If the user is in an area without cell coverage, embodiments enable the user to use their satellite communication-capable mobile device 102 to send an initial message requesting subscription information to subscribe for satellite service. A secure connection can be established in response to the initial request, and available subscriptions are determined based on the location of the mobile device 102, and communicated back to the mobile device 102. The user can then specify a selected subscription and payment information, which is communicated back to the gateway via the secure communications channel previously established. A suitable payment service provider can be chosen to handle the payment, based on the location of the mobile device 102. Typically, payment service providers are restricted to operate in certain regions. Hence, having a single payment service provider may not suffice for providing services across the globe. Embodiments determine the appropriate payment service provider based on the location of the mobile device 102, and facilitate the end-to-end credit/debit payment.

In some examples, the payment can be completed using a bank card (e.g., credit card, debit card, etc.) over the secure communication protocol. Using conventional solutions, the payment over satellite is not possible because payment mechanisms require a secure connection with the payment service provider. Embodiments utilize the session key generated as part of initial handshake to carry out the complete payment in the time-bound secure channel that has been established. Embodiments also facilitate use of a three domain security (3DS) challenge, e.g., one-time password (OTP), transfer for completing the end-to-end payment. Once the payment is complete, the system can enable the user-selected satellite-based subscription and authorize the mobile device 102 for subsequent communications over the satellite network 106.

As described herein, each of the various computing devices of system 100 may send communications (e.g., messages) to other device(s) and/or receive communications from other device(s). A communication that is sent from a first device to a second device may be sent directly from the first device to the second device, or may be sent from the first device to the second device by way of one or more intermediary devices. Similarly, a communication that is received at a first device from a second device may be received at the first device directly from the second device, or may be received at the first device from the second device by way of one or more intermediary devices.

Figure 2A:
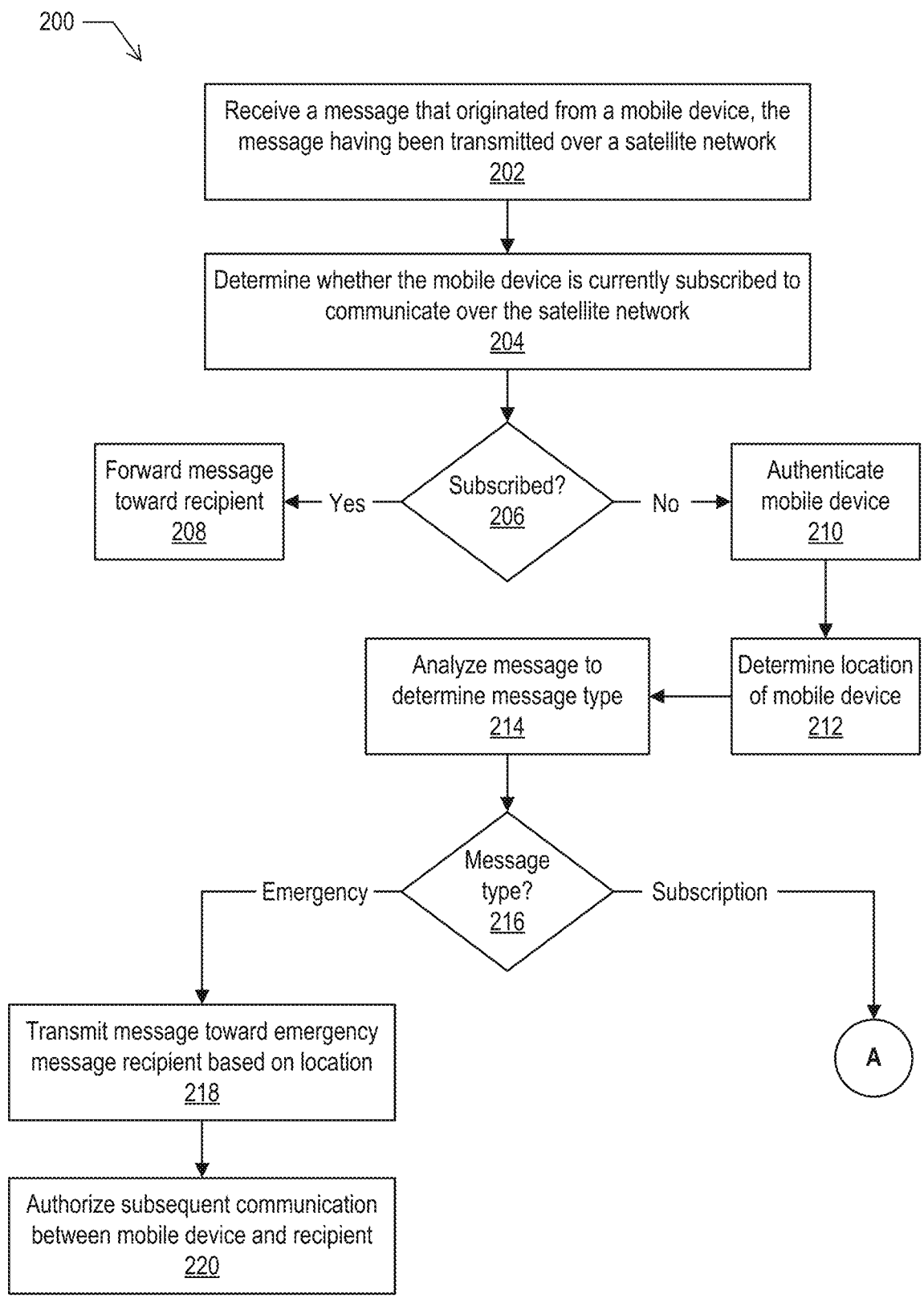
FIGS. 2A and 2B show a flow diagram of an example process for communication over a satellite network.
Figure 2B:
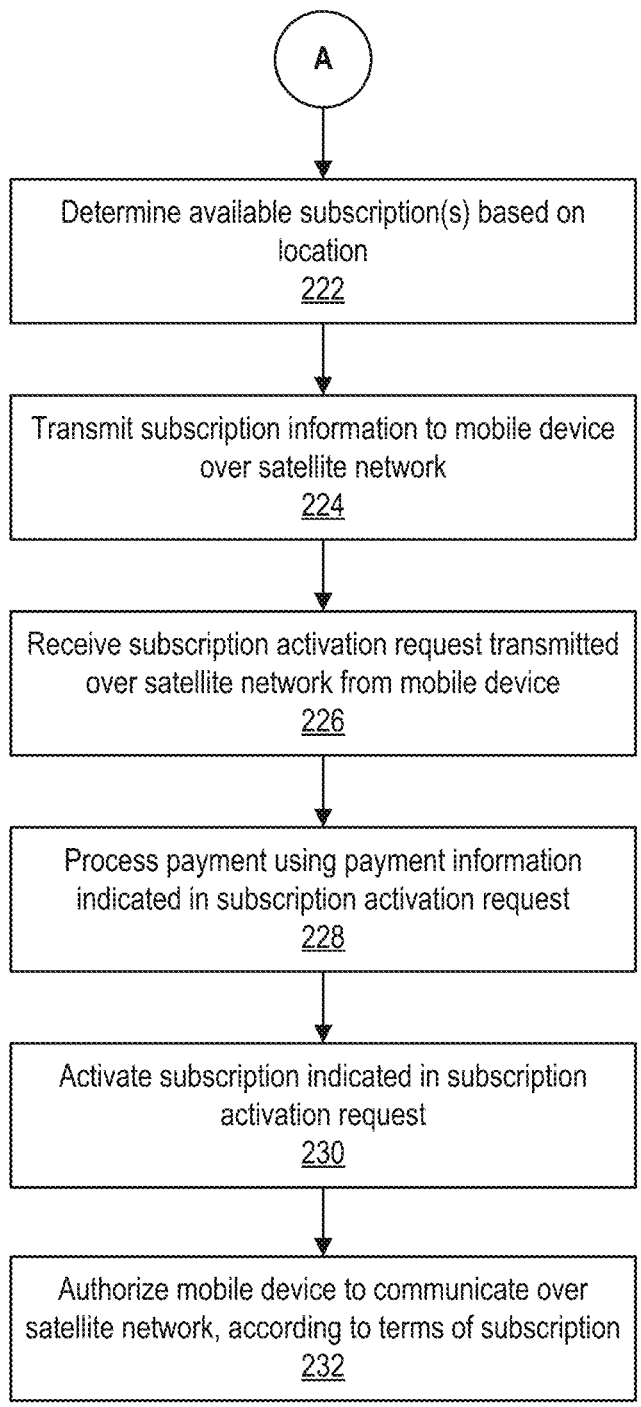

FIGS. 2A and 2B show a flow diagram 200 of an example process for communication over a satellite network, according to embodiments of the present disclosure. In some embodiments, the process can be performed by software module(s) executing on the cellular network gateway 110.

With reference to FIG. 2A, at 202, a message is received that originated from the mobile device 102. For example, the user can employ a communications module 104 (e.g., a messaging application) executed on the mobile device 102 to compose a message. The message may be sent from the mobile device 102 to the satellite network 106 using the (e.g., L band) transceiver of the mobile device 102. The satellite network 106 can then retransmit the message to the gateway 108, which can extract the message body and send it on to the gateway 110. In some examples, the gateway 108 determines the particular gateway 110 to send the message to, based on a current location of the mobile device 102.

At 204, a determination is made whether the mobile device 102 is currently subscribed to communicate over the satellite network 106. In some implementations, this determination may be made based on the mobile phone number of the mobile device 102, an identifier of the user of the mobile device 102, and/or some other piece of information that uniquely identifies the mobile device 102 and/or the user of the mobile device 102. In some implementations, this identifying information may be sent to the access control service 120, which may reply with an indication whether the device and/or user has a current subscription to use the satellite network 106, and/or is otherwise authorized. In some implementations, the cellular network gateway 110 or other system stores the mobile phone number in a subscription database, on the gateway 110 or elsewhere, when the user's subscription is activated. For example, the mobile phone number can be stored in the subscription database as part of the activate subscription step 776, as described with reference to FIG. 7B. When the mobile device 102 requests to send an SMS message or some other data that is conveyed over the satellite network 106, the cellular network gateway can access the subscription database to check whether the mobile device 102 has a current subscription to use the satellite network 106.

At 206, if it is determined that there is a current subscription, the process may proceed to 208 and the message is forwarded on through the cellular network 112 toward the recipient (e.g., destination phone number) indicated in the message. If it is determined that there is not a current subscription, the process may proceed to 210 and the mobile device 102 is authenticated and a secure connection is established between the mobile device 102 and the gateway 110. This process is described in further detail with reference to FIGS. 4A and 4B.

At 212, once a secure communication channel is established, a location is determined for the mobile device 102. In some examples, the location is determined based on information included in the message itself. For example, the message can include fields for latitude and longitude. In some examples, the location is determined based on information stored in the HLR 116 for the mobile device 102 phone number or other identifier.

At 214, the message is analyzed to determine a message type. For example, the message may include a tag indicating an SOS type. In another example, the message may include a tag indicating a subscription type, such that the message is a request to receive information regarding available subscriptions, or to initiate a subscription. The tag may be considered an authorization override, such that presence of the tag can indicate that the message should be handled for delivery even though the mobile device 102 is not yet authorized (e.g., not subscribed) for communication over the satellite network 106. The tag is described further with reference to FIG. 3.

At 216, if the message type is determined to be an SOS message, the process may proceed to 218 and the message is forwarded toward an emergency message recipient device 114. The appropriate recipient may be determined based on the current location of the mobile device 102, so that a geographically nearby emergency service can be identified to provide assistance to the user.

At 220, in some embodiments, subsequent communications over the satellite network 106 may be authorized between the mobile device 102 and the recipient device 114 (e.g., the emergency services provider). SOS message processing is described further with reference to FIG. 5.

At 216, if the message type is determined to be a subscription message, the process may proceed to 222 (with reference to FIG. 2B). At 222, available subscription(s) are determined for the mobile device 102. In some embodiments, the available subscription(s) may be determined based on the location of the mobile device 102. For example, subscription terms may vary based on geographic location.

At 224, the subscription information (describing the available subscription(s)) is transmitted to the mobile device 102 over the satellite network 106. The subscription information may be presented through the communications module 104 on the mobile device 102, allowing the user to select one of the available subscriptions to proceed with. The user may also provide payment information through the communications module 104, in some examples. Subscription information request processing is described further with reference to FIG. 6.

A subscription activation request, including the selected subscription and payment information, can then be generated by the communications module 104 and communicated over the satellite network 106. At 226, the subscription activation request is received at the gateway 110, having been communicated via the satellite network 106 and gateway 108.

At 228, the payment is processed using the payment information indicated in the subscription activation request. In some examples, the payment can be processed by the payment service 118. Payment can be through use of a payment card (e.g., bank card, credit card), secure OTP, or other suitable payment methods. In some instances, payment can be made by adding a charge to an existing account for the user's cellular service subscription.

At 230, in response to successful payment processing, the subscription may be activated for the mobile device 102. At 232, the mobile device 102 may be authorized for subsequent communication over the satellite network 106. Such authorization may be stored by the access control service 120. Subscription activation request processing is described further with reference to FIGS. 7A, 7B, and 7C.

Following 220 or 230, in some embodiments, subsequent communications between endpoint devices 102 and 114 may take place, with the satellite network 106 acting as messaging intermediary through use of burst messaging to communicate to and from the satellite. In such instances, subsequent messages can be through the secure communication channel established.

Figure 3:
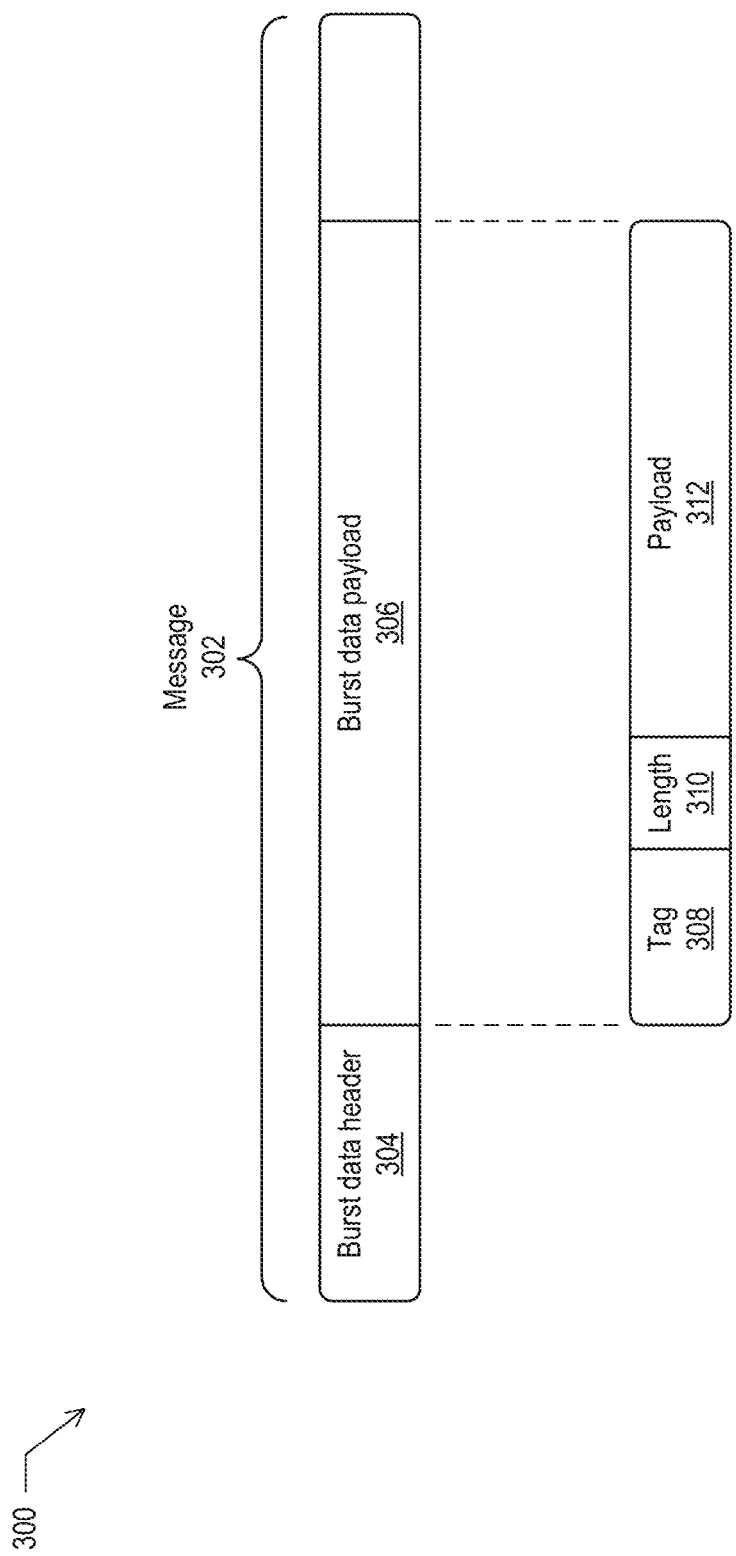
FIG. 3 is a schematic diagram of an example message format.

FIG. 3 is a schematic diagram 300 of an example message format, according to embodiments of the present disclosure. A message 302, such as the message that is sent to the satellite network 106 or sent from the satellite network 106, may be formatted as a burst message as described above. Accordingly, the message 302 may include a burst data header 304 and a burst data payload 306. The satellite gateway 108 may receive such a message that originated at the mobile device 102, and extract the burst data payload 306 for subsequent retransmission to the cellular gateway 110 for further processing. Such retransmission may be via a subsequent message that is sent by the gateway 108 using a suitable communications protocol, such as transmission control protocol/internet protocol (TCP/IP). The burst data payload 306 may be structured to include a tag 308, a length field 310, and a payload 312. Response messages received at the gateway 108 from the gateway 110 may be processed by the gateway 108 to add the burst data header 304 for communication to the satellite network 106 and subsequent retransmission to the mobile device 102. The tables below provide example message formats for the various types of messages.

Figure 4A:
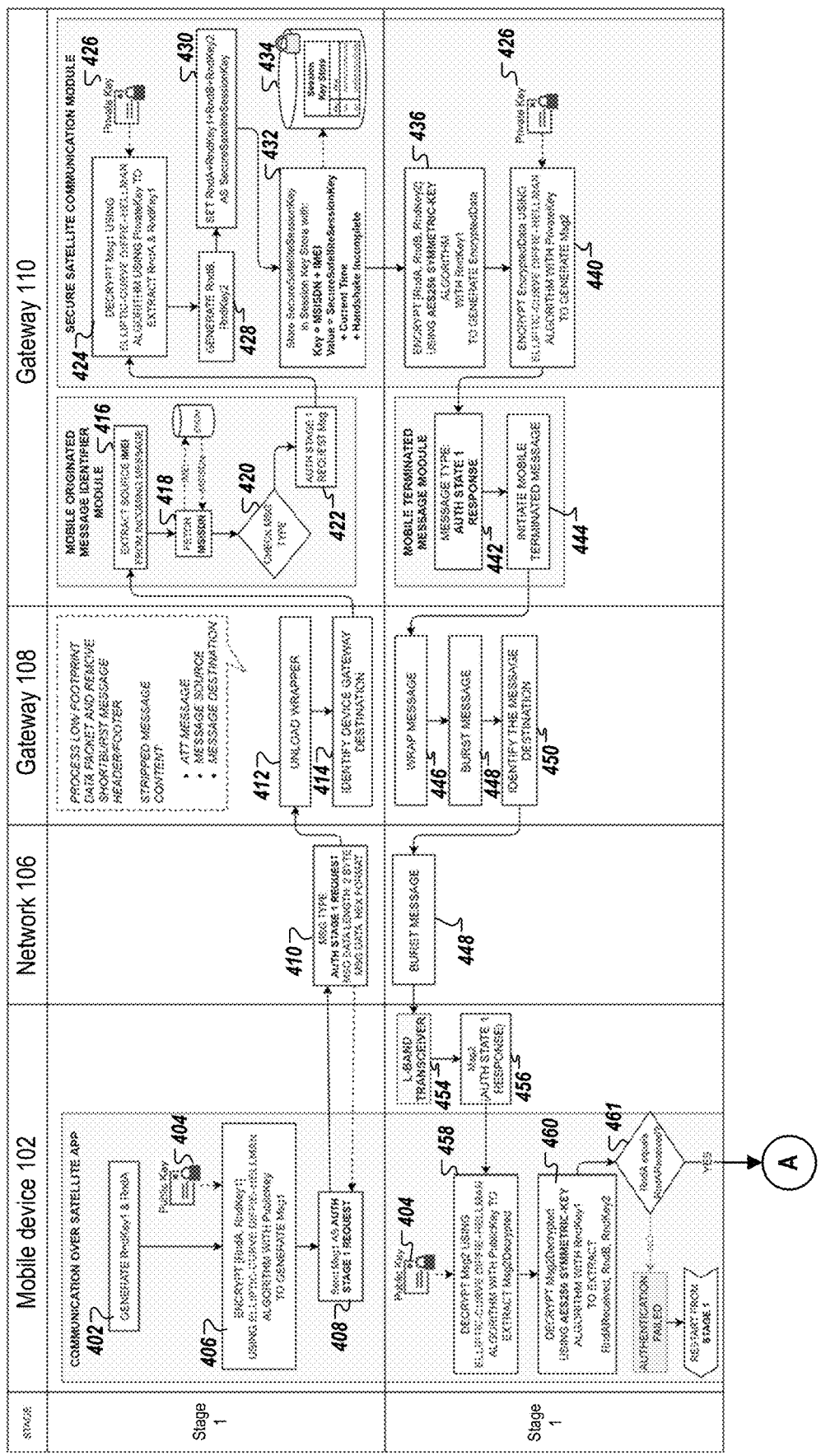
FIGS. 4A and 4B show a flow diagram of an example process for establishing secure communications over a satellite network.
Figure 4B:
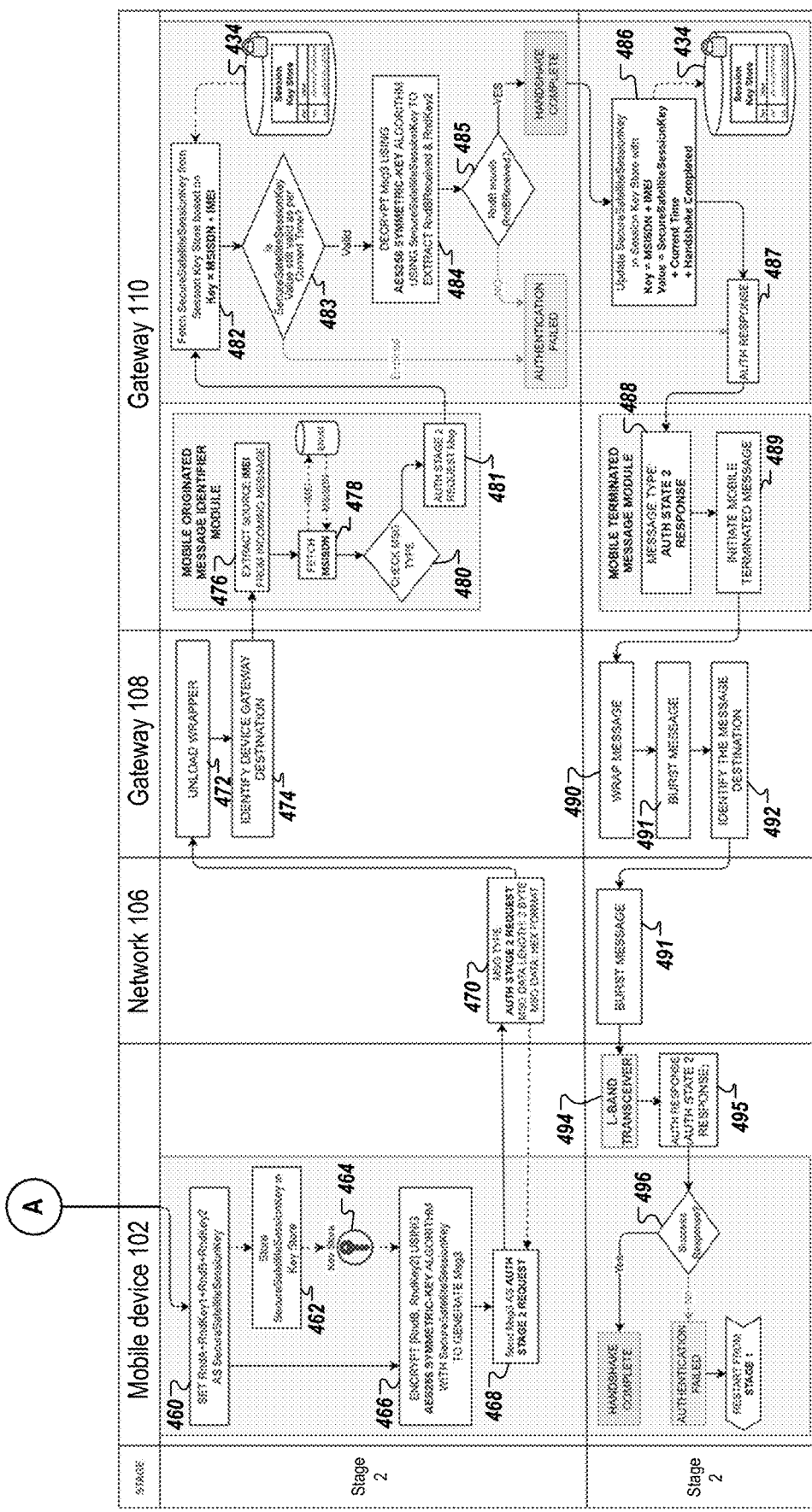

FIGS. 4A and 4B show a flow diagram of an example process for establishing secure communications over a satellite network, according to embodiments of the present disclosure. As shown, various operations of the process can be performed by the mobile device 102, the gateway 108, or the gateway 110. Operations performed on the mobile device 102 can be performed by a communications module 104, e.g., the communication over satellite app. Operations performed on the gateway 110 can be performed by module (s) 122, e.g., the mobile originated message identifier module, the mobile terminated message module, and/or the secure satellite communication module.

FIG. 4A illustrates stage 1 of the authentication handshake. In a request phase of stage 1, at 402, a first set of cryptographic data RndKey1 and RndA are generated and encrypted at 406, using public key 404. The encrypted data can be sent 408, as an authentication request, stage 1, as shown in Table 1. The message is conveyed 410 over satellite network 106 to gateway 108, which unloads 412 the wrapper of the message (e.g., extracts burst payload), and identifies 414 the device gateway 110 to send the message toward. In some implementations, the satellite network gateway 108 identifies a particular device gateway 110 to be used, based on the international mobile equipment identity (IMEI) of the mobile device 102 that originated the message. For example, each gateway 110 may be associated with a range or set of IMEIs, and the particular gateway 110 may be determined as the gateway 110 designated to handle the range or set of IMEIs that includes the IMEI of the mobile device 102. This association of IMEI to gateway 110 may be stored in a database (e.g., ENUM database) which stores information indicating the particular mobile station international subscriber directory number (MSISDN) of the gateway 110 associated with each of a plurality of IMEIs.

At the gateway 110, the source IMEI is extracted 416 from the message, and the MSISDN corresponding to that IMEI is retrieved 418 from the database. The message type is checked 420 to determine 422 this is an authentication stage 1 request message. The message can then be decrypted 424 using a private key 426, and a second set of cryptographic data RndB and RndKey2 is generated 428. A session key is generated 430 based on the first and second sets of cryptographic data. The session key may be stored 432 in a key store 434.

Proceeding to a response phase of stage 1, RndA, RndB, and RndKey2 are encrypted 436 with RndKey1, and the result is encrypted 440 using private key 426. The result is incorporated into authentication stage 1 response message that is generated 442 and initiated 444 for transmission toward the mobile device 102. The message is sent to the satellite gateway 108, which wraps 446 the message with a burst header to generate a burst message 448, and identifies 450 the message destination (e.g., the mobile device 102). The burst message 448 is conveyed via the satellite network 106 to the mobile device 102, and received through the L band transceiver 454 of the mobile device 102 (e.g., one of the transceiver(s) 124). The message is decrypted 458 using the public key 404, and the result is decrypted 460 to extract RndA, RndB, and RndKey2. If the received RndA equals the originally sent RndA 461, the authentication can proceed to stage 2. If not, the process may restart from stage 1.

FIG. 4B illustrates stage 2 of the authentication handshake. In a request phase of stage 2, at 460, a second session key is generated based on the cryptographic data as shown. The second session key is stored 462 in a key store 464, and encrypted 466 to generate the authentication stage 2 request message 468. The message is sent 470 over the satellite network 106 to the satellite gateway 108, which unloads 472 the wrapper and identifies 474 the device gateway 110 destination, as described above.

At the gateway 110, the source IMEI is extracted 476 from the message, and the MSISDN corresponding to that IMEI is retrieved 478 from the ENUM database. The message type is checked 480 to determine 481 this is an authentication stage 2 request message.

At the gateway 110, the first session key is fetched 482 from the key store 434, and checked 483 to determine if it is still valid. If not, authentication fails. If the first session key is still valid, it can be used to decrypt 484 the message to extract the cryptographic data. The extracted cryptographic data can be checked 485 to determine whether the sent RndB is equal to the received RndB. If not, authentication fails. If so, the process may proceed to the response phase of stage 2.

At 486, the session key can be updated in the key store 434 as shown. The authentication response 487, indicating either the failed authentication or the completed handshake, can be determined and incorporated into an authentication stage 2 response message 488. The message can be generated and initiated 489 for transmission to the satellite gateway 108. The gateway 108 can wrap 490 the message in a burst header to generate the burst message 491, and the message destination can be identified 492. The burst message 491 can be sent over the satellite network 106 and received through the L band transceiver 494 of the mobile device 102. The response message 495 is then analyzed to determine 496 whether the handshake was successful. If authentication failed, the process can restart from stage 1.

This authentication process provides for an authentication handshake to provide a secure connection between the mobile device 102 and the gateway 110. In some embodiments, the communications module 104 involved on the mobile device 102 may be a payment module that is part of, or communicates with, the messaging application. The public key that enables the handshake between the two entities can be provided to the payment module from a secure payment module on the gateway 110, while the mobile device 102 is connected on a cellular network. The secure payment module can maintain the private key. The ECC encryption mechanism can be used for encryptions and decryptions using public key and private key. An AES encryption mechanism can used for the encryptions and decryptions using other keys which are generated during the handshake process. Once the handshake is complete and successful, both the entities can use the session key (e.g., the SecureSatelliteSessionKey shown in FIG. 4B) to secure communications during the current session.

Tables 1–4 are example message formats for messages that may be sent during the authentication process illustrated in FIGS. 4A and 4B.

TABLE 1

Authentication request, stage 1

| Tag | Description | Length | Values |
|---|---|---|---|
| MSG START | Byte indicating the start of message | 1 | 0x17 |
| MSG TYPE | Authentication | 1 | 0xC7 |
| MSG LENGTH | Message length | 2 | |
| DATA | Stage of authentication | 1 | 0x01 |
| | Message | X | Stage 1: Encrypted message with Public key. Data encrypted (RndA and RndKey1) using ECC |
| CRC | Cycle redundancy check | 2 | 0x00 0x00 |
| MSG END | Bye indicating end of message | 1 | 0xFF |

TABLE 2

Authentication response, stage 1

| Tag | Description | Length | Values |
|---|---|---|---|
| MSG START | Byte indicating the start of message | 1 | 0x18 |
| MSG TYPE | Authentication response | 1 | 0xC8 |
| MSG LENGTH | Message length | 2 | Includes Data, CRC and Msg End length |
| DATA | Stage of authentication | 1 | 0x01 |
| | Status | 1 | OK: 0x00, FAILED: 0x01 |
| | Error code | 1 | |
| | Message | X | Stage 1: Encrypted message with RndKey1 as key. Data encrypted (RndA, RndB and RndKey2) using ECC. Then Encrypted data is again encrypted using PrivateKey. |
| CRC | Cycle redundancy check | 2 | 0x00 0x00 |
| MSG END | Bye indicating end of message | 1 | 0xFF |

TABLE 3

Authentication request, stage 2

| Tag | Description | Length | Values |
|---|---|---|---|
| MSG START | Byte indicating the start of message | 1 | 0x17 |
| MSG TYPE | Authentication | 1 | 0xC7 |
| MSG LENGTH | Message length | 2 | |
| DATA | Stage of authentication | 1 | 0x02 |
| | Message | X | Stage 2: From Stage 1 response, RndA, RndB and RndKey2 is decrypted using RndKey1. For stage 2, data is encrypted with SecureSatelliteSessionKey (RndA + RndKey1 + RndB + RndKey2). Here Data to be encrypted is (RndB, RndKey2) using AES encryption algorithm. |
| CRC | Cycle redundancy check | 2 | 0x00 0x00 |
| MSG END | Bye indicating end of message | 1 | 0xFF |

TABLE 4

Authentication response, stage 2

| Tag | Description | Length | Values |
|---|---|---|---|
| MSG START | Byte indicating the start of message | 1 | 0x18 |
| MSG TYPE | Authentication response | 1 | 0xC8 |
| MSG LENGTH | Message length | 2 | Includes Data, CRC and Msg End length |
| DATA | Stage of authentication | 1 | 0x02 |
| | Status | 1 | OK: 0x00, FAILED: 0x01 |
| | Error code | 1 | |
| CRC | Cycle redundancy check | 2 | 0x00 0x00 |
| MSG END | Bye indicating end of message | 1 | 0xFF |

Figure 5:
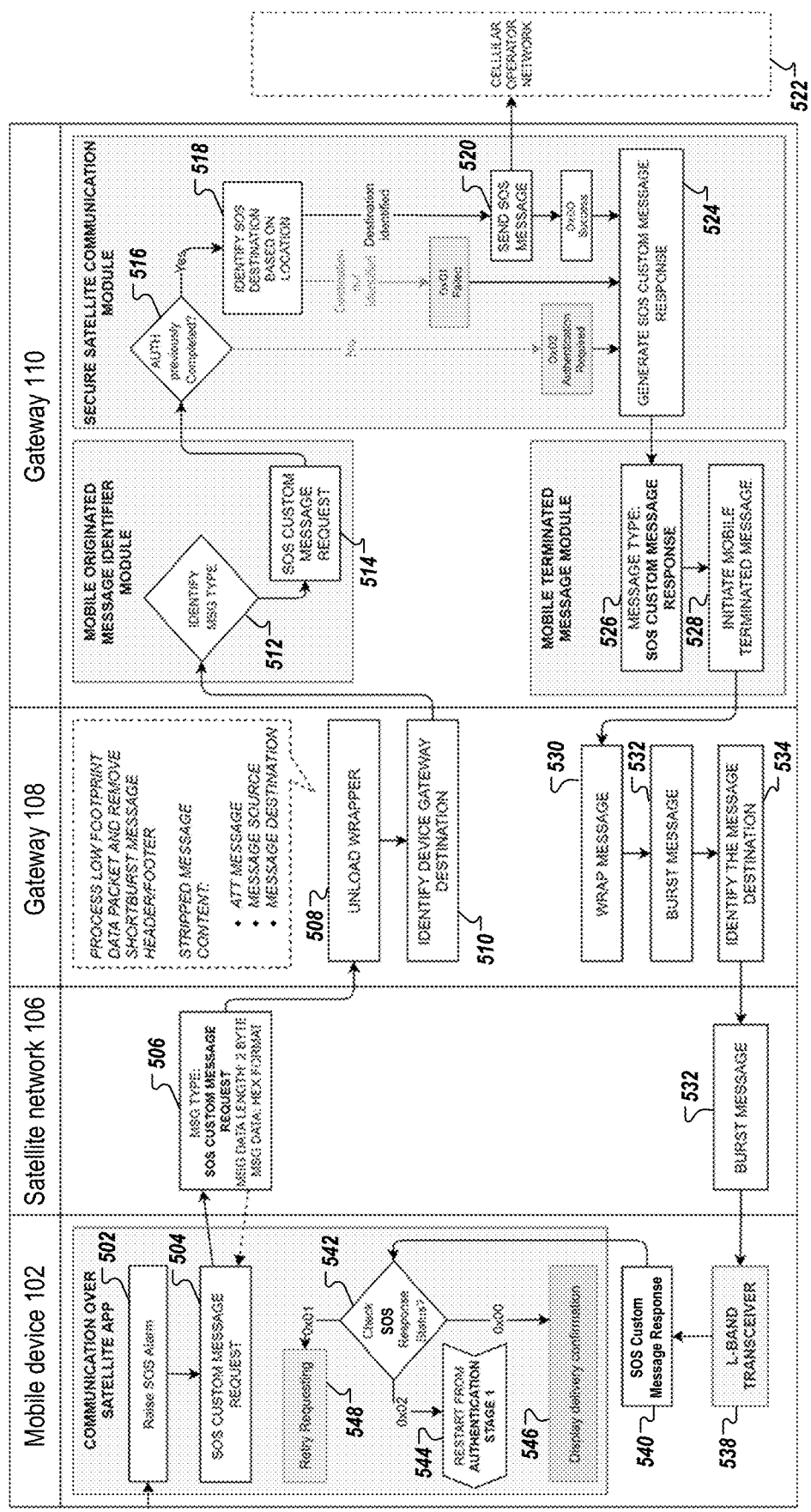
FIG. 5 is a flow diagram of an example process for communicating an emergency message over a satellite network.

FIG. 5 is a flow diagram of an example process for communicating an emergency message over a satellite network, according to embodiments of the present disclosure. As shown, various operations of the process can be performed by the mobile device 102, the gateway 108, or the gateway 110. Operations performed on the mobile device 102 can be performed by a communications module 104, e.g., the communication over satellite app. Operations performed on the gateway 110 can be performed by module(s) 122, e.g., the mobile originated message identifier module, the mobile terminated message module, and/or the secure satellite communication module.

At 502, an indication may be received that the user wishes to send an emergency message, and a SOS custom message request 504 can be generated. The message can be sent 506 over the satellite network 106 and received by the satellite gateway 108, which unloads 508 the wrapper and identifies 510 the device gateway 110 destination as described above. At the gateway 110, the message type is identified 512 and the SOS custom message request is received 514. A determination 516 is made whether authentication has previously completed. If not, the SOS custom message response can be generated 524 to indicate that authentication is required. If authentication has been completed previously, the emergency message destination can be identified 518 based on the location of the mobile device 102. If a destination cannot be identified, the custom message response may indicate a failure to forward the emergency message. If the destination is identified, the emergency message can be forwarded 520 to the cellular network 522 for transmission toward the emergency message destination. In that case, the custom message response can indicate success.

The emergency custom message response 526 can be generated 524 and initiated 528 for transmission toward the mobile device 102, and sent to the satellite gateway 108. The gateway 108 can wrap 530 the message to generate the burst message 532, and the message destination can be identified 534. The burst message 532 can be sent over the satellite network 106 and received through the L band transceiver 538 of the mobile device 102. The emergency message response 540 can be checked 542. If the response indicates failure, the process may restart authentication 544 (e.g., if authentication has not yet been completed) or retry the request 548 (e.g., if delivery was otherwise unsuccessful). If the response indicates that the emergency message was successfully delivered, a delivery confirmation may be displayed 546.

Through this process, a user can send an SOS message when in remote locations outside of cellular coverage. In some embodiments, when the user requests that an SOS message be sent, the authentication handshake will be performed prior to sending the SOS message. The device message gateway 110 can verify the type of the message and identify that subscription validation is not needed. The process can identify the relevant SOS destination based on the current user location. In some embodiments, this location may be provided in the message. The process can then send the message and return a success or failure indication in the SOS custom response message. The module executing on the mobile device 102 can notify the user regarding the status of the SOS message delivery (e.g., success or failure).

Tables 5 and 6 are example message formats for messages that may be sent during the emergency process illustrated in FIG. 5.

TABLE 5 emergency request

| Tag | Description | Length | Values |
| --- | --- | --- | --- |
| MSG START | Byte indicating the start of message | 1 | 0x17 |
| MSG TYPE | Custom message | 1 | 0xC4 |
| MSG LENGTH | Message length | 2 | |
| DATA | Type | 1 | 0x01 (indicating SOS type) |
| | Message parameters | X | |
| CRC | Cycle redundancy check | 2 | 0x00 0x00 |
| MSG END | Bye indicating end of message | 1 | 0xFF |

TABLE 6 emergency response

| Tag | Description | Length | Values |
| --- | --- | --- | --- |
| MSG START | Byte indicating the start of message | 1 | 0x18 |
| MSG TYPE | Custom message | 1 | 0xC5 |
| MSG LENGTH | Message length | 2 | Includes Data, CRC and Msg End length |
| DATA | Status | 1 | OK: 0x00, FAILED: 0x01 |
| | Error code | 1 | Indicating reason for failure |
| CRC | Cycle redundancy check | 2 | 0x00 0x00 |
| MSG END | Bye indicating end of message | 1 | 0xFF |

Figure 6:
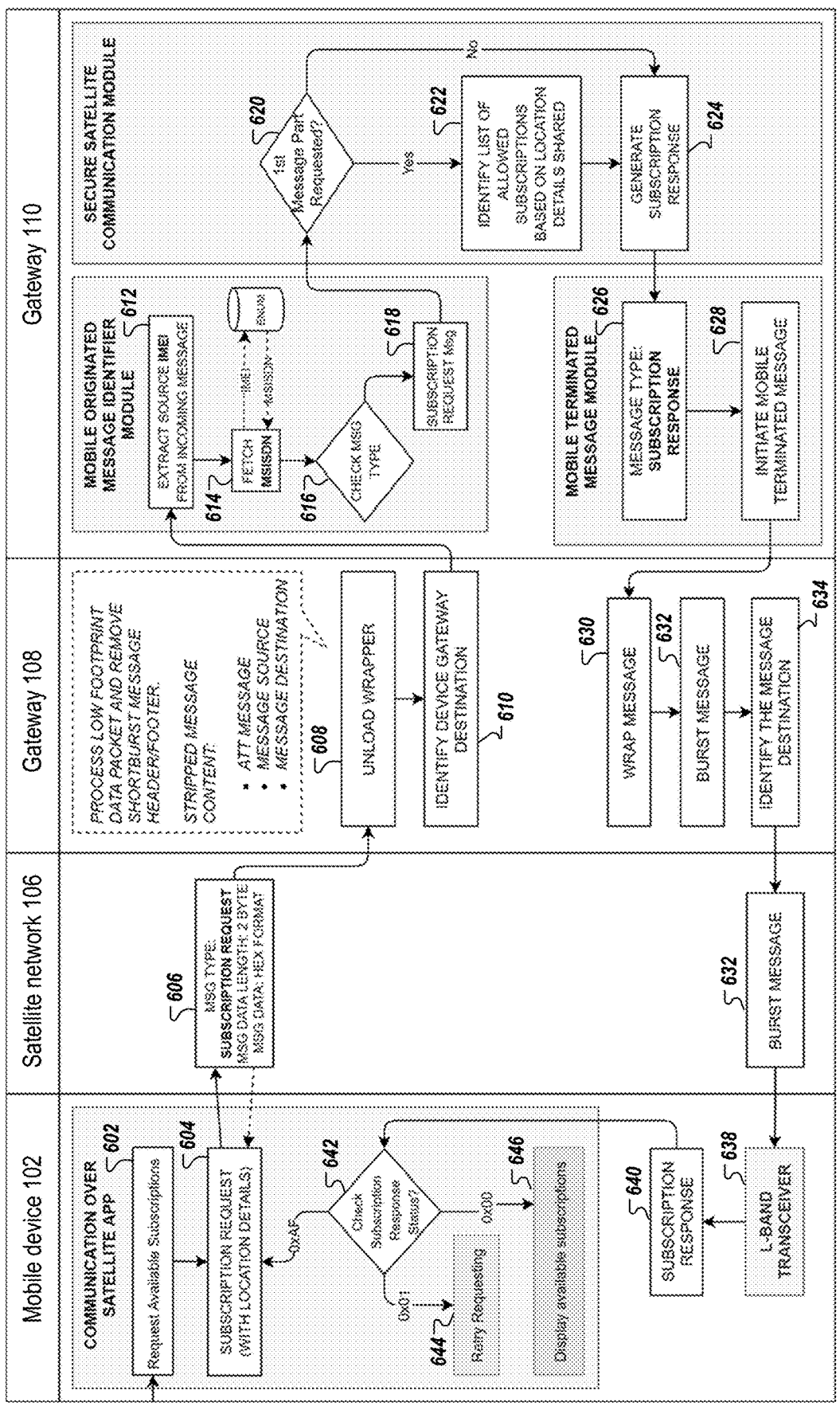
FIG. 6 is a flow diagram of an example process for communicating subscription information over a satellite network.

FIG. 6 is a flow diagram of an example process for communicating subscription information over a satellite network, according to embodiments of the present disclosure. As shown, various operations of the process can be performed by the mobile device 102, the gateway 108, or the gateway 110. Operations performed on the mobile device 102 can be performed by a communications module 104, e.g., the communication over satellite app. Operations performed on the gateway 110 can be performed by module(s) 122, e.g., the mobile originated message identifier module, the mobile terminated message module, and/or the secure satellite communication module.

At 602, an indication can be received, e.g., through the communications module 104, that the user is requesting information regarding available subscriptions for satellite network access. A subscription request message 604 can be generated, and sent 606 over the satellite network 106 to the satellite gateway 108. The gateway 108 can unload 608 the wrapper and identify 610 the device gateway 110 destination, as described above. The message can be forwarded to the gateway 110, where source NEI is extracted 612 and MSISDN is fetched 614 as described above. The message type can be checked 616 and determined to be a subscription request message 618.

In some instances, the subscription list can be large enough that it cannot be communicated to the mobile device 102 in a single response. In such instances, the list may be sent in multiple parts using multiple responses messages. The "Message Part" indicator field (e.g., see Table 7 below) in the subscription request indicates which available subscription option is being communicated in the message. In some implementations, each available subscription may be communicated in a separate message. For example, if there are five available subscription options, five messages may be sent.

A determination is made 620 whether this request is for a first message part. If so, a list of available subscriptions can be identified 622 based on the location, and a subscription response 624 can be generated that includes the subscription information describing the available subscription(s), or at least the first part of the subscription information. If the first message part is not being requested at this time (e.g., if a subsequent message part of a multipart message is being requested), the appropriate next-part response can be generated 624 to include the next portion of subscription information to be communicated The subscription response message 626 is initiated 628 for transmission toward the mobile device 102. The satellite gateway 108 can receive the message, wrap 630 the message to generate the burst message 632, and identify 634 the message destination. The burst message 632 can then be transmitted over the satellite network 106 and received by the L band transceiver 638 of the mobile device 102. The subscription response 640 can then be checked 642 for its status. If failure, the request can be retried 644. If success, the available subscription information can be displayed 646 to the user through the communications module 104. The process may then proceed as described in FIGS. 7A, 7B, and 7C, if the user indicates that they want to activate a subscription.

In some embodiments, the authentication handshake may be performed prior to the subscription request. Once the authentication is successful, the user can request available subscription options. A payment application service executing on the gateway 110 or in communication with the gateway 110 can identify the available subscription(s) based on mobile device location, and respond with the list of one or more subscriptions including details for each. In some instances, the communications module 104 (e.g., a payment app) on the mobile device 102 can request subsequent details regarding the subscriptions if the response status indicates that the module should do so. The communications module 104 can display available subscription(s) to the user, and enable the user to select one to activate.

For each available subscription, the subscription information can include, but is not limited to, the following: a time usage metric, indicating a time allocation for the subscription (e.g., number of minutes); a duration during which the subscription is valid (e.g., number of days, months, years, etc. until the subscription expires); a cost of the subscription, in a suitable currency, per unit of time; and a (e.g., text) description of the subscription, describing its features, cost, duration, etc.

Tables 7 and 8 are example message formats for messages that may be sent during the subscription information request process illustrated in FIG. 6.

TABLE 7 subscription information request

| Tag | Description | Length | Values |
|---|---|---|---|
| MSG START | Byte indicating the start of message | 1 | 0x17 |
| MSG TYPE | Get subscription | 1 | 0xC9 |
| MSG LENGTH | Message length | 2 | Includes Data, CRC and Msg End length. |
| DATA | Location latitude | 4 | Latitude of the current location |
|  | Location longitude | 4 | Longitude of the current location |
|  | Message part | 1 | 0x01 (For 1st Part) 0x02 (For 2nd Part), and so on. |
| CRC | Cycle redundancy check | 2 | 0x00 0x00 |
| MSG END | Bye indicating end of message | 1 | 0xFF |

TABLE 8 subscription information response

| Tag | Description | Length | Values |
|---|---|---|---|
| MSG START | Byte indicating the start of message | 1 | 0x18 |
| MSG TYPE | Get subscription response | 1 | 0xCA |
| MSG LENGTH | Message length | 2 | Includes Data, CRC and Msg End length. |
| DATA | Status | 1 | 0x00 - OK 0x01 - FAILED 0xAF - Additional Frame |
|  | Error code | 1 |  |
|  | Number of subscriptions available | 1 | e.g. 0x05 (for 5 list items) |
|  | Item number | 1 | e.g., 0x01, 0x02, 0x03, etc. (e.g., indicating which item in list) |
|  | Number of minutes | 3 | e.g. 0x10 (indicating 10 minutes) |
|  | Validity duration | 1 | e.g., 0x03 |
|  | Duration unit | 1 | 0x01 - month 0x02 - day 0x03 - year |
|  | Cost (e.g., in $) | 4 | e.g., 0x00 0x00 0x15 0x7C ($55 in cents) |
|  | Description length | 1 | e.g., 0x5E - 94 bytes (for description in UTF-16 format) |
|  | Description | 1-100 | e.g., Includes 10 Voice min + 10 SMS + Free voicemail |

TABLE 8-continued subscription information response

| Tag | Description | Length | Values |
|---|---|---|---|
| CRC | Cycle redundancy check | 2 | 0x00 0x00 |
| MSG END | Bye indicating end of message | 1 | 0xFF |

Figure 7A:
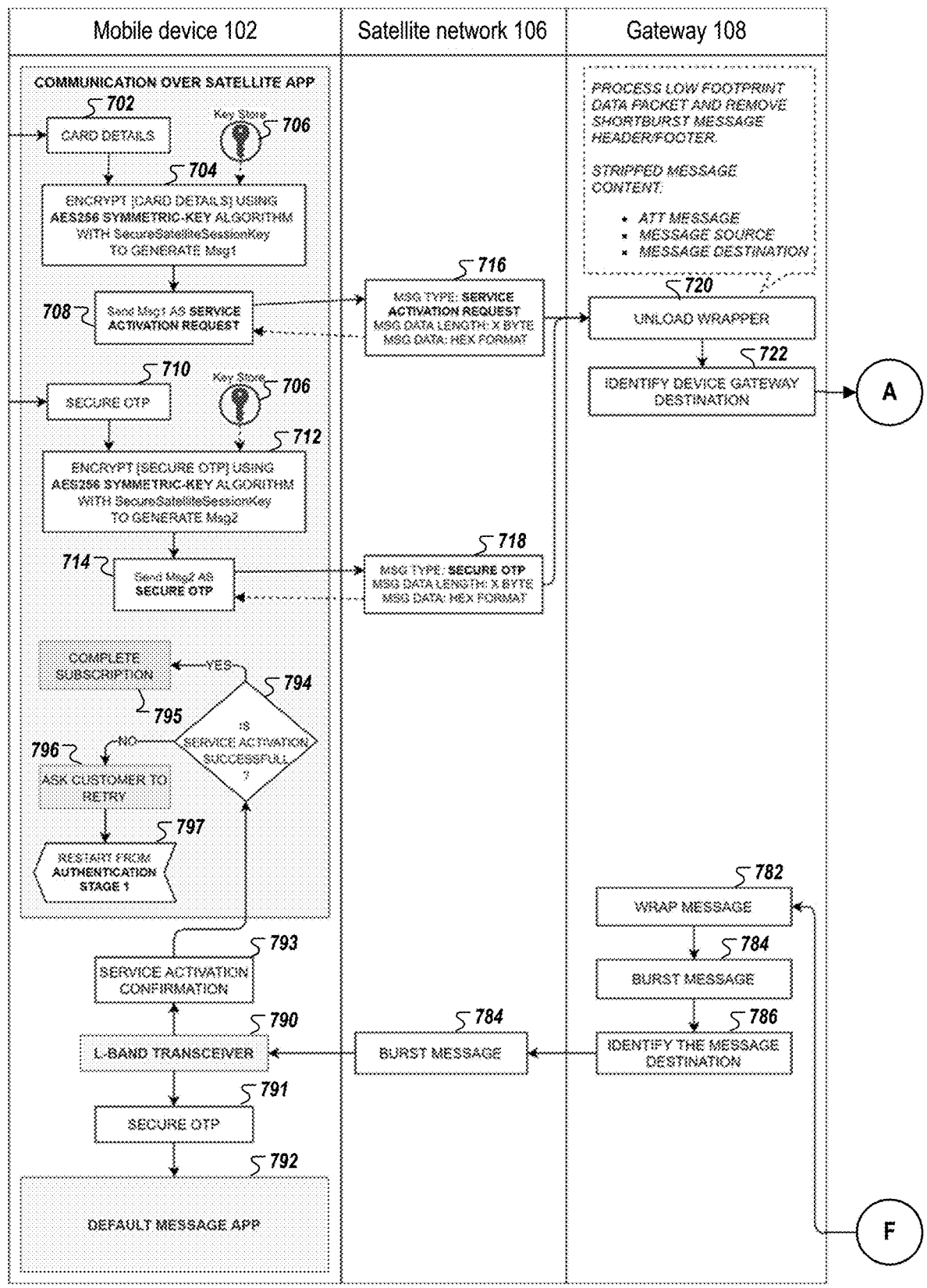
FIGS. 7A, 7B, and 7C show a flow diagram of an example process for determining and activating a subscription over a satellite network.
Figure 7B:
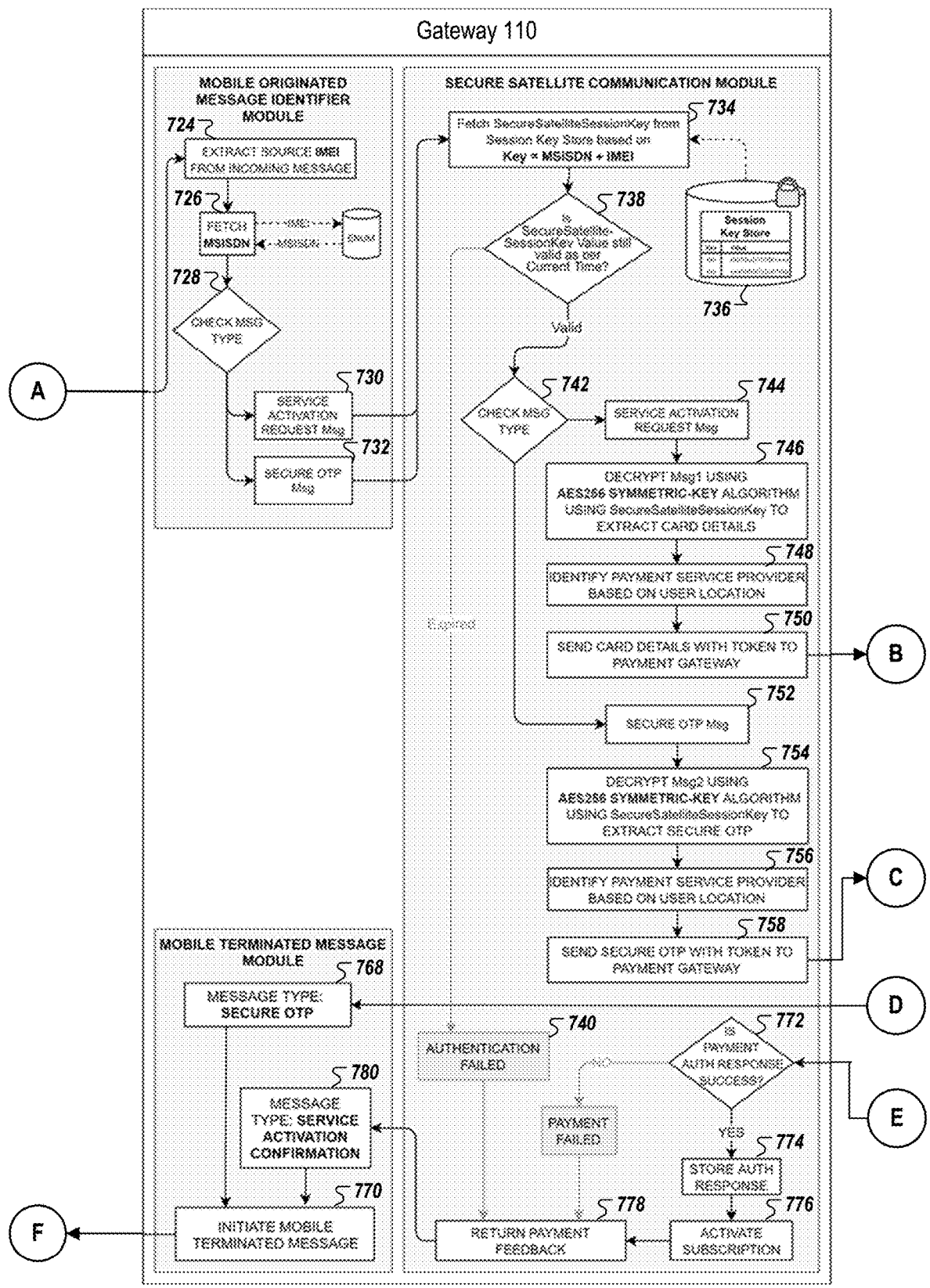
Figure 7C:
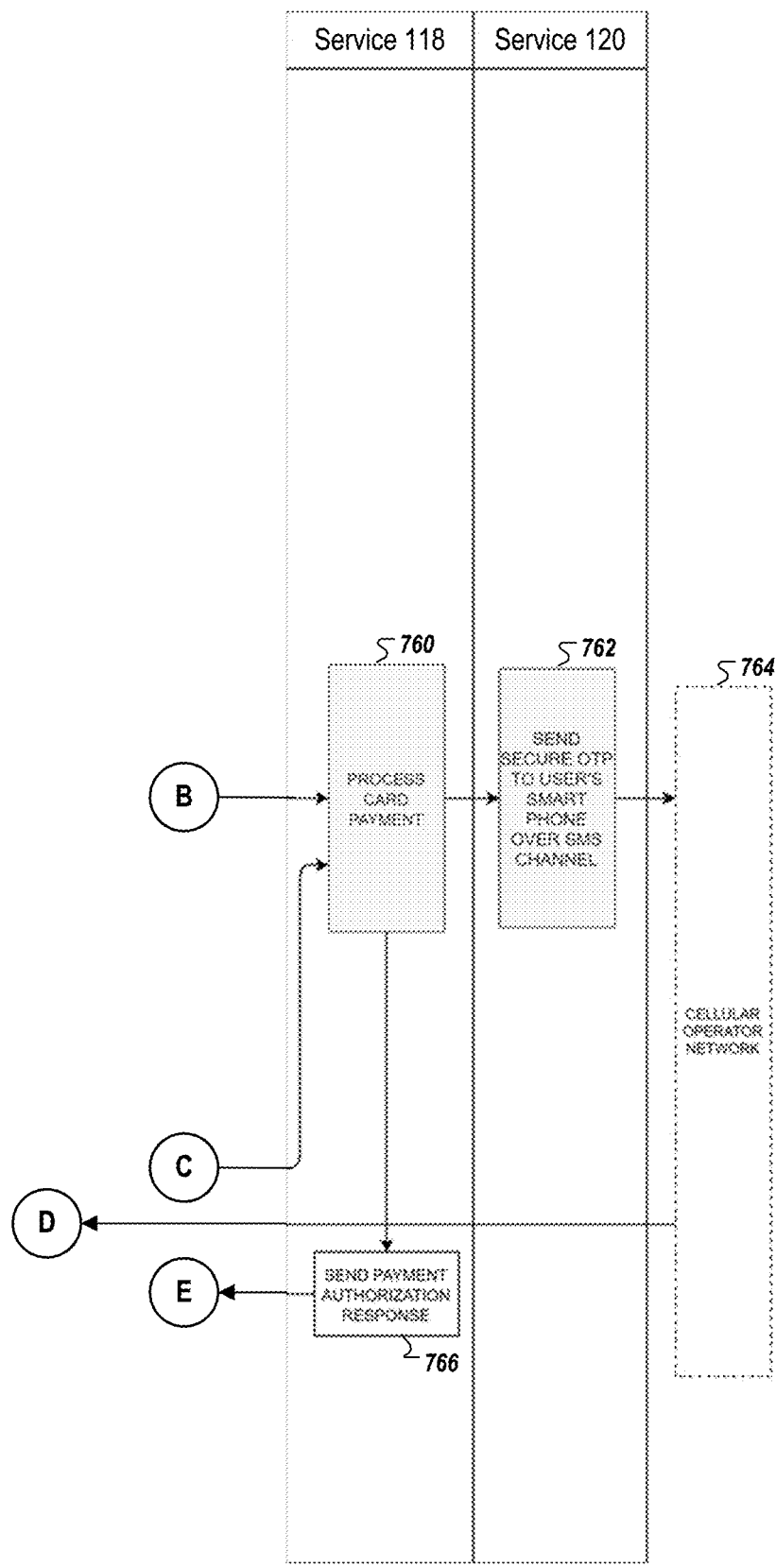

FIGS. 7A, 7B, and 7C show a flow diagram of an example process for determining and activating a subscription over a satellite network, according to embodiments of the present disclosure. As shown, various operations of the process can be performed by the mobile device 102, the gateway 108, the gateway 110, the service 118, or the service 120. Operations performed on the mobile device 102 can be performed by a communications module 104, e.g., the communication over satellite app. Operations performed on the gateway 110 can be performed by module(s) 122, e.g., the mobile originated message identifier module, the mobile terminated message module, and/or the secure satellite communication module.

This flow illustrates how the payment over the satellite channel can be carried out using 3DS authentication. The 3DS authentication provides enhanced security to prevent misuse of the user's payment information (e.g., credit card, debit card information). The 3DS protocol can employ three domains to ensure transaction security, e.g., the merchant/acquirer domain, the issuer domain, and the interoperability domain. Once the user has chosen the payment method, they can enter the (e.g., credit card, bank card) details, and the payment app can communicate with secure payment module over the short burst channel, using the secured connection. Once payment is processed, the subscription process can proceed.

With reference to FIG. 7A, at 702, payment method information (e.g., card details) can be received, as provided by the user through the communications module 104 (e.g., communications application and/or payment application). The payment method information can be encrypted 704 using a public key 706 from a key store on the mobile device 102, and the encrypted message can be sent 708 as a service activation request 716 through the satellite network 106 to the satellite gateway 108. In examples where secure OTP 710 is to be used, the secure OTP information can be encrypted 712 using a public key 706 from a key store, and the encrypted message can be sent 714 as a secure OTP message 718 through the satellite network to the satellite gateway 108. Message 716 or 718 can be received at the satellite gateway 108, the message wrapper can be unloaded 720 to extract the message, and the device gateway 110 destination can be identified 722 as described above.

With reference to FIG. 7B, the source IMEI can be extracted 724 and MSISDN fetched 726 as described above, and the message type can be checked 728. If the message type is a service activation request type 730, or secure OTP type 732, the process may proceed to fetch 734 a session key from the key store 736. The session key can be checked 738 to determine whether it is still valid. If not, authentication fails. If the session key is still valid, the message type can be checked 742. For service activation type messages, the message 744 can be decrypted 746, a payment service provider can be identified 748 based on current mobile device location and/or user location, and the payment information (e.g., card details) can be sent 750 to a payment gateway of a payment service 118. For secure OTP type messages, the message 752 can be decrypted 754, a payment service provider can be identified 756 based on current mobile device location and/or user location, and the secure OTP and token can be sent 758 to the payment gateway of the payment service 118.

With reference to FIG. 7C, the payment information or secure OTP information can be received by the payment service 118. The service 118 can process 760 a card payment and send 766 a payment authorization response indicating success or failure. For secure OTP type payments, the message can be forwarded to a service 120, which then sends 762 the secure OTP token to the mobile device 102 over SMS channel through the cellular operator network 764.

Returning to FIG. 7B, for payments made by processing a card payment, a determination is made 772 whether the payment authorization response indicates success or failure. For success, the authorization response can be stored 774, the user's subscription can be activated 776, and payment feedback 778 can indicate success. If the payment failed, or if the previous attempted authentication failed 740, the payment feedback can indicate failure. The payment feedback can be incorporated into a response message 780 confirming the status (e.g., success or failure) of the service activation. Alternatively, for secure OTP type payments, the secure OTP token can be incorporated into a response message 768 and sent to the mobile device 102. The message 768 or message 780 is initiated 770 for transmission toward the mobile device 102.

Returning to FIG. 7A, the response message is received at the satellite gateway 108 and wrapped 782 to generate the burst message 784, and the message destination (e.g., the mobile device 102) is identified 786. The burst message 784 is then sent over the satellite network 106 and received by the L band transceiver 790 of the mobile device 102. In instances when the message is a secure OTP response message 791, the message is forwarded to a default message app 792, such as a communications module 104. In such instances, the message may include the OTP which is provided by the payment service to the cellular network gateway 108. Cellular network gateway 108 can send the OTP to the designated mobile device 102. After the message including the OTP arrives at the mobile phone 102, the user can open the default message app and enter the OTP as input to the message app, which can then provide the OTP as confirmation to the payment gateway via a messaging gateway to verify payment.

In instances when the message is a service activation response message, the confirmation information 793 in the message is checked 794 to determine whether the subscription activation has been successful. If not, the customer can be prompted to retry 796 and/or authentication can be reattempted 797. If successful, the user can be notified 795 that their subscription is activated.

Tables 9-11 are example message formats for messages that may be sent during the subscription activation process illustrated in FIGS. 7A, 7B, and 7C.

TABLE 9 service activation request (payment card)

| Tag | Description | Length | Values |
| --- | --- | --- | --- |
| MSG START | Byte indicating the start of message | 1 | 0x17 |
| MSG TYPE | Service activation request | 1 | 0xCB |
| MSG LENGTH | Message length | 2 | Includes Data, CRC and Msg End length. |

TABLE 9-continued service activation request (payment card)

| Tag | Description | Length | Values |
| --- | --- | --- | --- |
| DATA | Message | X | Card details and subscription item#, encrypted with SecureSatelliteSessionKey key. Data encrypted using AES encryption algorithm. |
| CRC | Cycle redundancy check | 2 | 0x00 0x00 |
| MSG END | Bye indicating end of message | 1 | 0xFF |

TABLE 10 service activation request (secure OTP)

| Tag | Description | Length | Values |
| --- | --- | --- | --- |
| MSG START | Byte indicating the start of message | 1 | 0x17 |
| MSG TYPE | Secure OTP | 1 | 0xCC |
| MSG LENGTH | Message length | 2 | Includes Data, CRC and Msg End length. |
| DATA | OTP data | X | Encrypted "Secure OTP" using with SecureSatelliteSessionKey key. Data encrypted using ECC. |
| CRC | Cycle redundancy check | 2 | 0x00 0x00 |
| MSG END | Bye indicating end of message | 1 | 0xFF |

TABLE 11 service activation confirmation response

| Tag | Description | Length | Values |
| --- | --- | --- | --- |
| MSG START | Byte indicating the start of message | 1 | 0x18 |
| MSG TYPE | Service activation confirmation | 1 | 0xCD |
| MSG LENGTH | Message length | 2 | Includes Data, CRC and Msg End length. |
| DATA | Status | 1 | Success - 0x00 Fail - 0x01 |
| | Error code | 1 | e.g., indicating reason for failure |
| CRC | Cycle redundancy check | 2 | 0x00 0x00 |
| MSG END | Bye indicating end of message | 1 | 0xFF |

Although examples herein describe certain operations being performed by the satellite gateway 108 and certain other operations being performed by the cellular network gateway 110, embodiments are not limited to this particular distribution. In some instances, certain operations may be performed by the satellite gateway 108 instead of by the cellular network gateway 110. In some instances, a single gateway may perform the operations described as being performed by gateways 108 and 110.

Figure 8:
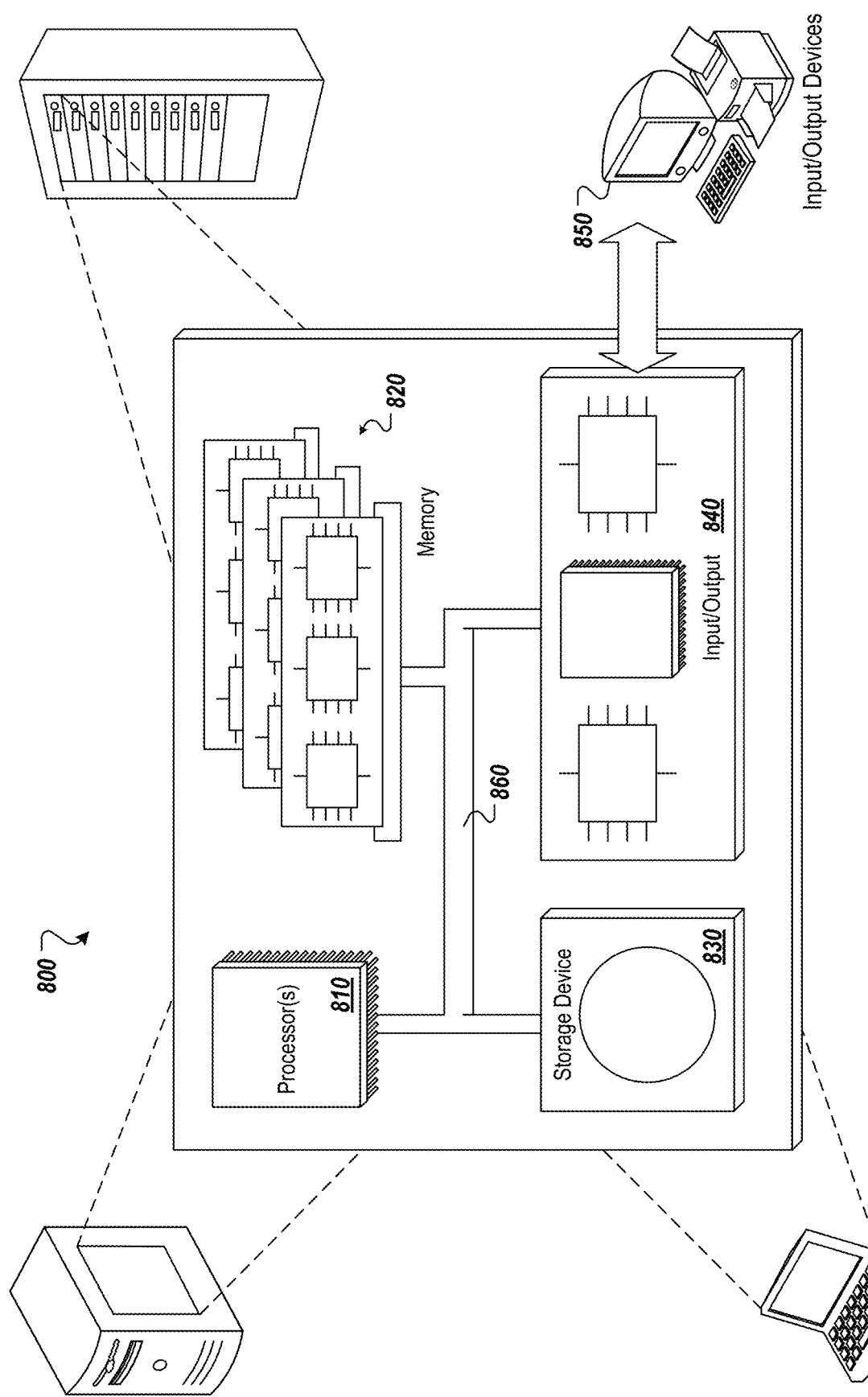
FIG. 8 is a schematic diagram of an example computer system.

FIG. 8 illustrates a schematic diagram of an exemplary generic computer system 800. The various computing devices shown in FIG. 1, such as mobile device 102, recipient device 114, gateway 108, gateway 110, and/or computing device(s) hosting the HLR 116, the payment service 118, and/or the access control service 120, may be implemented to include one or more of the components of system 800.

The system 800 includes one or more processors 810, a memory 820, a storage device 830, and an input/output device 840. Each of the components 810, 820, 830, and 840 can be interconnected using one or more system busses 860. The processor(s) 810 are capable of processing instructions for execution within the system 800. In some implementations, the processor(s) 810 include single-threaded processor(s). In some implementations, the processor(s) 810 include multi-threaded processor(s). The processor(s) 810 are capable of processing instructions stored in the memory 820 and/or on the storage device 830 to perform various operations, such as presenting textual, graphical, audio, video, image(s), and/or other types of information through a user interface on the input/output device 850.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 provides mass storage for the system 800. In some implementations, the storage device 830 is a computer-readable medium. In various different implementations, the storage device 830 may be a floppy disk device, a hard disk device, a solid state drive, an optical disk device, a tape device, universal serial bus stick, and/or some other suitable type of storage device.

The input/output device(s) 850 provides input/output operations for the system 800. The input/output device(s) 850 can include input devices including, but not limited to, a keyboard, a pointing device, a mouse, a touchpad, a camera, a microphone, an orientation or movement sensor (e.g., accelerometer, gyroscopic sensor, etc.), and/or a game controller. The input/output device(s) 850 can also include output devices including, but not limited to, a display, an audio speaker, a haptic actuator, a printer, and so forth.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any suitable programming language, including compiled or interpreted languages, and it can be deployed in any form, including as a stand-alone program or as a module, component, subroutine, library, or other unit suitable for use in a computing environment. A module is one or more computer programs and/or portion(s) of computer program(s) that is executable by one or more processors.

Suitable processors for the execution of a program of instructions include, by way of example, both general and special purpose microprocessors, and the sole processor or one of multiple processors of any kind of computer. Generally, a processor can receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files. Such devices can include magnetic disks, such as internal hard disks and removable disks, magneto-optical disks, and/or optical disks. Storage devices suitable for tangibly embodying computer program instructions and data include any suitable form of non-volatile memory, including by way of example semiconductor memory devices, such as EPROM, EEPROM, flash memory devices, magnetic disks such as internal hard disks and removable disks, magneto-optical disks, and CD-ROM and DVD-ROM disks. The processor and the memory can be supplemented by or incorporated into one or more application-specific integrated circuits (ASICs).

To provide for interaction with a user, the features can be implemented on a system having a input/output device(s), such as a display device. Display devices can include any suitable type of display, such as cathode ray tube (CRT), liquid crystal display (LCD), and so forth, for displaying information to the user. Input device(s) such as a keyboard and/or a pointing device such as a mouse or a rail trackball can enable user input to the system.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as those discussed herein. The relationship of client and server arises by virtue of computer programs running on the respective computers and having a client-server relationship to each other. The servers may be part of a cloud, which may include ephemeral aspects.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. In addition, the processes depicted in the figures do not necessarily require the particular order shown, or sequential order, to achieve desirable results. In certain implementations, multitasking and parallel processing may be advantageous.

Particular implementations of the subject matter have been described. Other implementations are within the scope of the following claims.

What is claimed is:

1. A computer-implemented method comprising:
    receiving, at a network gateway, a message that is transmitted over a satellite network from a mobile device, the message comprising a mobile device identifier and a message type;
    determining, by the network gateway, that the mobile device is not currently subscribed to communicate over the satellite network based on the mobile device identifier;
    based at least partly on determining that the mobile device is not currently subscribed to communicate over the satellite network, analyzing, by the network gateway, the message to determine the message type; and
    based at least partly on determining that the message type corresponds to an authorization override, providing, by the network gateway, authorization for the mobile device to communicate over the satellite network.

2. The method of claim 1, wherein the providing authorization comprises:
    based at least partly on determining that the message type is an emergency message type, sending the message to an emergency message destination.

3. The method of claim 2, wherein the providing authorization further comprises:
    determining a location of the mobile device; and
    determining the emergency message destination based on the location of the mobile device.

4. The method of claim 1, wherein the providing authorization comprises:
    based at least partly on determining that the message type is a subscription request message type, sending subscription information to the mobile device over the satellite network, the subscription information describing one or more subscriptions available for the mobile device;
    receiving, in response to the subscription information, a subscription activation request transmitted over the satellite network from the mobile device, the subscription activation request identifying a particular subscription of the one or more subscriptions; and
    activating the particular subscription for the mobile device.

5. The method of claim 4, wherein the providing authorization further comprises:
    determining a location of the mobile device based on location information included in the message; and
    determining, based on the location, the one or more subscriptions available for the mobile device.

6. The method of claim 4, wherein the subscription information includes, for each of the one or more subscriptions:
    a time usage metric;
    a duration;
    a cost; and
    a description.

7. The method of claim 4, wherein the subscription activation request includes encrypted payment information.

8. The method of claim 1, wherein the providing authorization further comprises:
    authenticating the mobile device, including performing an authentication handshake over the satellite network between the network gateway and the mobile device, the authentication handshake employing one or more burst messages that are communicated via the satellite network.

9. A computing system comprising:
    at least one processor; and
    memory communicatively coupled to the at least one processor, the memory storing instructions which, when executed by the at least one processor, cause the at least one processor to perform operations comprising:
    receiving, at a network gateway, a message that is transmitted over a satellite network from a mobile device, the message comprising a mobile device identifier and a message type;
    determining, by the network gateway, that the mobile device is not currently subscribed to communicate over the satellite network based on the mobile device identifier;
    based at least partly on determining that the mobile device is not currently subscribed to communicate over the satellite network, analyzing, by the network gateway, the message to determine the message type; and
    based at least partly on determining that the message type corresponds to an authorization override, providing, by the network gateway, authorization for the mobile device to communicate over the satellite network.

10. The system of claim 9, wherein the providing authorization comprises:
    based at least partly on determining that the message type is an emergency message type, sending the message to an emergency message destination.

11. The system of claim 10, wherein the providing authorization further comprises:
    determining a location of the mobile device; and
    determining the emergency message destination based on the location of the mobile device.

12. The system of claim 9, wherein the providing authorization comprises:
    based at least partly on determining that the message type is a subscription request message type, sending subscription information to the mobile device over the satellite network, the subscription information describing one or more subscriptions available for the mobile device;
    receiving, in response to the subscription information, a subscription activation request transmitted over the satellite network from the mobile device, the subscription activation request identifying a particular subscription of the one or more subscriptions; and
    activating the particular subscription for the mobile device.

13. The system of claim 12, wherein the providing authorization further comprises:

determining a location of the mobile device based on location information included in the message; and determining, based on the location, the one or more subscriptions available for the mobile device.

14. The system of claim 12, wherein the subscription information includes, for each of the one or more subscriptions:
a time usage metric;
a duration;
a cost; and
a description.

15. The system of claim 12, wherein the subscription activation request includes encrypted payment information.

16. The system of claim 9, wherein the providing authorization comprises:
authenticating the mobile device, including performing an authentication handshake over the satellite network between the network gateway and the mobile device, the authentication handshake employing one or more burst messages that are communicated via the satellite network.

17. One or more non-transitory computer-readable storage media storing instructions which, when executed, cause a network gateway to perform operations comprising:
receiving, at a network gateway, a message that is transmitted over a satellite network from a mobile device, the message comprising a mobile device identifier and a message type;
determining, by the network gateway, that the mobile device is not currently subscribed to communicate over the satellite network based on the mobile device identifier;
based at least partly on determining that the mobile device is not currently subscribed to communicate over the satellite network, analyzing, by the network gateway, the message to determine the message type; and
based at least partly on determining that the message type corresponds to an authorization override, providing, by the network gateway, authorization for the mobile device to communicate over the satellite network.

18. The one or more computer-readable storage media of claim 17, wherein the providing authorization comprises:
based at least partly on determining that the message type is an emergency message type, sending the message to an emergency message destination.

19. The one or more computer-readable storage media of claim 17, wherein the providing authorization comprises:
based at least partly on determining that the message type is a subscription request message type, sending subscription information to the mobile device over the satellite network, the subscription information describing one or more subscriptions available for the mobile device;
receiving, in response to the subscription information, a subscription activation request transmitted over the satellite network from the mobile device, the subscription activation request identifying a particular subscription of the one or more subscriptions; and
activating the particular subscription for the mobile device.

20. The one or more computer-readable storage media of claim 17, wherein the providing authorization comprises:
authenticating the mobile device, including performing an authentication handshake over the satellite network between the network gateway and the mobile device, the authentication handshake employing one or more burst messages that are communicated via the satellite network.

* * * * *